United States Patent [19]

Sergent

[11] Patent Number: 5,270,513
[45] Date of Patent: Dec. 14, 1993

[54] PROCESS FOR MANUFACTURING EXTRUSION DIES AND DIES THUS OBTAINED

[75] Inventor: Olivier M. G. Sergent, Paris, France

[73] Assignee: Eropol Finance et Developpement, Vernouillet, France

[21] Appl. No.: 912,682

[22] Filed: Jul. 13, 1992

[51] Int. Cl.[5] .......................... B23H 9/12; B23H 7/02
[52] U.S. Cl. ............................... 219/69.12; 219/69.17
[58] Field of Search ........................... 219/69.12, 69.17; 76/107.1, 107.4, 107.6, 4; 72/260, 467; 425/462

[56] References Cited

U.S. PATENT DOCUMENTS

| | | | |
|---|---|---|---|
| 3,768,344 | 10/1973 | Feldcamp | 76/107.1 |
| 4,333,000 | 6/1982 | Shimizu | 219/69.12 |
| 4,736,656 | 4/1988 | Futamura | 219/69.17 |
| 4,756,682 | 7/1988 | Blaise | 425/462 |
| 5,095,734 | 3/1992 | Asher | 72/467 |

FOREIGN PATENT DOCUMENTS

| | | | |
|---|---|---|---|
| 55-83533 | 6/1980 | Japan | 219/69.17 |
| 59-152023 | 8/1984 | Japan | 219/69.17 |
| 61-14824 | 1/1986 | Japan | 219/69.17 |
| 2143445 | 2/1985 | United Kingdom | 76/107.1 |
| 2184371 | 6/1987 | United Kingdom | 76/107.1 |

Primary Examiner—Geoffrey S. Evans
Attorney, Agent, or Firm—Rodgers & Rodgers

[57] ABSTRACT

In this process for manufacturing extrusion dies each comprising a main body (4) and a mandrel (12M) for channeling the material or materials extruded simultaneously, mounted in this body and provided, or not, with a core (15) and, on the one hand, the main body (4) of the die is provided with a central extrusion passage (5) made, along the outer profile (17) of the product desired, by means of a cutting operation using wire (2) erosion and, on the other hand, the mandrel (12M) internal to the die body, provided, or not, with a core (15), is obtained by molding a material suitably resisting the heat of extrusion and having good toughness.

9 Claims, 2 Drawing Sheets

PROCESS FOR MANUFACTURING EXTRUSION DIES AND DIES THUS OBTAINED

The present invention relates to a process for manufacturing extrusion dies and to dies obtained by the implementation of this process. More particularly, it relates to such a process by which, on the one hand, the main body of the die is provided with a central extrusion passage made, along the outer profile of the product desired, by means of a cutting operation using wire erosion and, on the other hand, the mandrel internal to the die body, provided or not with a core, is obtained by molding a material suitably resisting the extrusion heat and having good toughness such as, inter alia, a thermohardening resin or an impermeable ceramic product.

In the prior art, a process was known, from Patent DE-A-3,121,697, for producing a conical portion on a tool by cutting a plane surface portion of the latter by means of an electrical-discharge metal-wire cutting or wire-erosion operation. A process was also known, from Patent GB-A-954,348, for manufacturing metallic extrusion dies of the type comprising a cylindrical internal surface provided with a narrow helical groove and which is to be used as an extrusion die for a tube provided with an external helical rib, the helical groove in the cylindrical bore being obtained by electrical disintegration and removal of metal by an electrical-discharge machining operation by using a cylindrical conductive electrode, of the same diameter as the tube and provided with an external helical rib. Moreover, a process was known, from Patent FR-A-1,437,621, for manufacturing helical matrix made from stellite, for drawing or extrusion, which consists in using, on the one hand, a copper electrode whose helical profile corresponds to the profile of the part to be obtained by extrusion and, on the other hand, a cylindrical block made from stellite having, on each of its upper and lower faces, a conical recess centered on its axis, a central hole which is made between the apexes of these two conical recesses for the passage of a dielectric fluid and, after mounting the electrode on the spindle of an electrical-discharge machining machine, in centrally drilling the stellite block by electrical-discharge machining by means of the electrode which is set into a suitable helical movement.

More recently, a process has been taught, by Patent FR-A-2,598,652, for manufacturing extrusion dies which consists in the first place in producing the main body of a die from a blank, generally cylindrical, comprising an internal conical recess and provided with a frontal wall in which the extrusion passage corresponding to the outer profile of the product which is to be obtained by extrusion is cut by an electrical-discharge wire machining operation and then, in the second place, in machining an electrode, preferably made from copper, by means of another electrical-discharge wire machining operation, which electrode will serve as a tool for the production of the mandrel intended to be housed in the conical recess of the die body and obtained following a prismatic electrical-discharge machining operation, this electrode being furthermore provided with one or more passages cut along the outer profile of the mandrel core, should the latter have one, depending on the internal channel or channels desired in the extruded product and, finally, in the third place, in carrying out the machining of the mandrel, as has just been described, by a prismatic electrical-discharge machining operation.

As the inventor has been able to observe, in all the prior processes which have just been mentioned, the manufacture of the copper electrode and the prismatic electrical-discharge machining operation using this electrode as a tool for producing the mandrel of the die body, are extremely expensive and, in addition, consume a great deal of time using specialized labor. Consequently, after numerous studies and experiments, the inventor has managed to achieve a lower cost in the manufacture of mandrels for die bodies by simplifying the currently known process which has just been previously mentioned, that is to say by eliminating the prismatic electrical-discharge machining operating and by replacing it with a operation for molding the mandrel by using a blank of shape similar to that of the said electrode as a mold and, in addition, by utilizing, for the manufacture of this mold, a less expensive material than copper, such as, for example, graphite or aluminum or alternatively other products which are reputed to be resistant to the temperatures for molding the product utilized for the manufacture of this mandrel and which do not undergo deformations at these temperatures.

Thus, in accordance with the present invention, the process for manufacturing an extrusion die which forms the subject of the invention utilizes, on the one hand, the means known in the art which consists in producing the main body of the die from a blank provided with an internal conical recess and in making, in the bottom wall of this recess, by an electrical-discharge wire machining operation, a calibrated passage cut to the form of the outer profile of the product to be obtained by extrusion, taking into account the swell conditions of the material or of the various materials which are to be extruded simultaneously but, on the other hand, this process is noteworthy in that the die mandrel, intended to be mounted in the conical recess of the die body and provided, or not, with a core which is to be engaged in the calibrated extrusion passage of the latter, is obtained by a molding operation made in a mold comprising, internally the counter-shaped recess for this mandrel, that is to say machined in a cylindrical blank provided with a conical cavity of dimensions corresponding to those which it is desired to obtain for the outer profile of this mandrel, this conical cavity being provided with radial grooves in order to obtain, on the outer wall of this mandrel, ribs for forming between them flow channels for the material or the various materials extruded simultaneously in the direction of the extrusion passage of the body of the die. The bottom wall of this conical cavity is furthermore provided with a core-forming recess should the molded mandrel be provided therewith, this recess having an inner profile corresponding to that of the inner channel or channels which the extruded product is to comprise and a depth determined such that, when it is inserted into the extrusion passage, its free end is flush with the external wall of the body of the die.

Moreover, as has been stated in the preamble of this description, in order to reduce to a minimum the cost of the mold for producing the mandrel with respect to that of the copper electrode which was utilized up to now for machining the mandrel by means of a prismatic electrical-discharge machining operation, a blank made from material of a type chosen for being able to be machined easily while having a suitable degree of toughness and sufficient heat resistance is utilized for the formation of this mold, in order that the mold obtained does not deform and does not undergo degradation during the operation for molding the mandrel.

Among other materials found to be suitable for producing such a mold it is possible to mention, by way of non-limiting examples, aluminum and graphite.

Furthermore, in order to produce the mandrel it is possible to utilize any moldable material based on thermohardening resin, that is to say a material which becomes very hard after molding and which will not be able to undergo deformation through the action of the heat generated during the extrusion operation. It is also possible to produce this mandrel by utilizing as molding material an impermeable ceramic product or alternatively a metallic material, in the form of grains of metallic powder, which is suitable for undergoing a molding operation using hot or cold sintering and which, after this operation, is sufficiently rigid and compact in order to exhibit a suitable degree of toughness.

Furthermore, according to the invention, when the mandrel which it is desired to manufacture is of very small size and may comprise only ribs of small thickness for channeling the material or materials extruded simultaneously, the counter-shaped recess for molding this mandrel, before again closing the mold in which it constitutes the lower mold, is provided, in each of the radial grooves of its conical cavity, a metallic strip intended to replace each external radial rib of the molded mandrel, these strips being sealed, after demolding, over their entire height projecting initially from the radial grooves, into the molded material constituting the body of the mandrel.

By way of information, it may be noted that the dies obtained by the implementation of the present manufacturing process, even through they can be adapted to certain conventional extrusion heads, are more particularly designed in order to be mounted behind so-called "controlled-stream" extrusion heads for several extrusion materials, these types of extrusion head forming the subject of Patents FR-79,31,048 and FR-80,24,721 (corresponding to U.S. Pat. No. 4,367,050) and which can be mounted on any conventional extruder head by means of the insertion of an interface flange, but also being more particularly adapted for their mounting on a multiple extrusion material extruder forming the subject of Patent FR-86,07,035 (U.S. Pat. No. 4,756,682).

Other characteristics of the process according to the present invention will emerge from the description of the attached diagrams showing the development of the phases of this novel process compared to those of the process applied up to now, these diagrams comprising:

BRIEF DESCRIPTION OF THE DRAWINGS

FIGS. 1, 1a, 1b, 1c, 1d, 1e, 1f, 1g, 1h, 1i, 1j which indicate the various phases of the process for manufacturing dies applied up to now, and FIGS. 2, 2a, 2b, 2c, 2d, 2e, 2g, 2g, 2h, 2i which indicate the simplified phases of the present process for manufacturing dies.

Figure 1A:
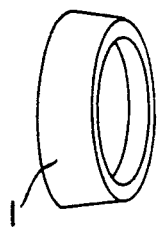
Figure 1B:
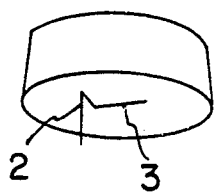
Figure 1C:
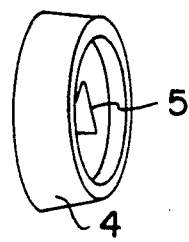
Figure 1D:
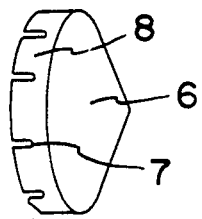
Figure 1E:
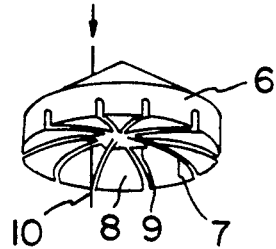
Figure 1F:
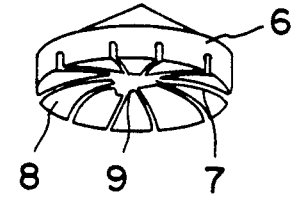
Figure 1G:
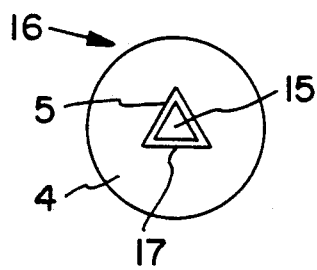
Figure 1H:
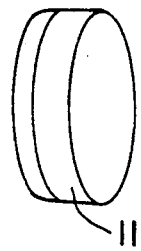
Figure 1I:
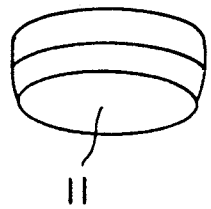
Figure 1J:
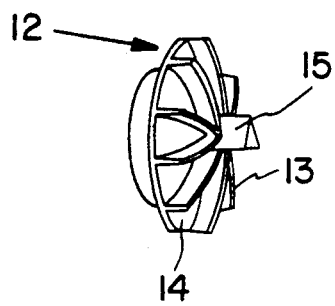

As may be seen in FIGS. 1a–1j, the known process utilizes, for the manufacture of the main die body, a blank (1) in which the outer profile (3) of the product which is to be obtained by extrusion is cut at phase A, by an electro-erosion wire (2) machining operation, in order to obtain, at phase B, the main die body (4) provided with the calibrated extrusion passage (5). Next, in order to produce, in this known process, the electrode for machining the internal mandrel of the die body, a copper blank (6) is utilized which is provided with radial grooves (7) which define between them the sectors (8) which will machine corresponding radial channels during the production of the mandrel. As is observed at phase C, when the die mandrel is to comprise one or more cores for defining one or more channels internal to the extruded product, one or more passages (9) are cut by an electro-erosion wire (10) machining operation for producing this core or these cores, in order to obtain, at phase D, the completed electrode provided with its passage or passages (9) of dimensions corresponding to the outer profile of the core or cores. Finally, in order to produce the mandrel, a blank (11) is utilized to which, at phase E, a prismatic electro-erosion machining operation is carried out in order to obtain, at phase F, a mandrel (12) provided, on the one hand, with radial ribs (13) corresponding to the grooves (7) of the electrode and, on the other hand, with radial channels (14) corresponding to the sectors (8) of the electrode, these ribs (13) and channels (14) coming to an end around the projecting core or cores (15). As may be seen at phase G, the mounting of this mandrel (12) in the die body (4), together with its core (15) which penetrates into the passage (5) of this body, provides a core die (16) whose extrusion passage (17), or so-called die passage, permits the extrusion of the wall of a triangular tubular extruded section (shown by a heavy black line in phase G).

Figure 2A:
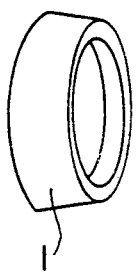
Figure 2B:
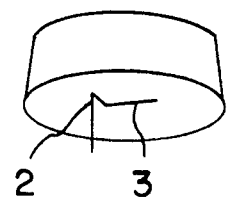
Figure 2C:
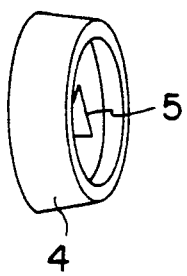
Figure 2D:
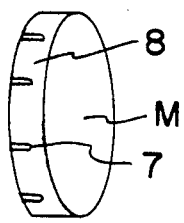
Figure 2E:
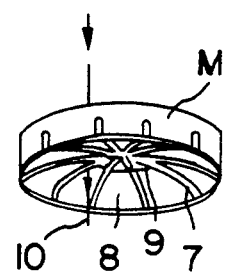
Figure 2F:
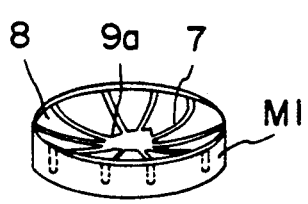
Figure 2G:
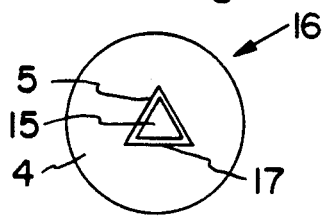
Figure 2H:
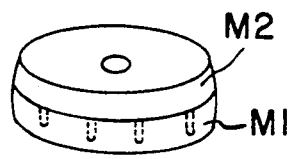
Figure 2I:
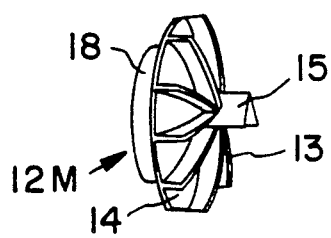

As may be observed, FIGS. 2a–2i shows the simplified phases of the novel process for manufacturing dies compared with the known process. As regards the manufacture of the main die body in this novel process, as before, a blank (1) is utilized to which, at phase A, the same electro-erosion wire (2) machining operation is carried out in order to obtain, at phase B, the main die body (4) provided with the calibrated extrusion passage (5).

By contrast, in this novel process for the manufacture of the mandrel mold a blank (M) is utilized, made for example from light alloy, from aluminum or from graphite and provided, as previously with the electrode blank (6), with radial grooves (7) which define between them sectors (8). Just as for the electrode (6), a cut (9) is made in the mold blank (M), at phase C, by an electro-erosion wire (10) machining operation or any other suitable operation depending on the material constituting this blank, so as to provide, at phase D, a lower mold portion (M1) provided with a cavity (9a) to the dimensions of the outer profile of the core (15) and in which this core will be molded. After that, at phase E, the lower mold portion (M1) is covered by an upper portion (M2) in which the cavity for molding the rear shoulder (18) of the mandrel will have been made beforehand. Finally, as may be seen at phase F, after filling the mold assembly (M1-M2) utilizing a suitable moldable material, for example based on thermohardening resin, or else an impermeable ceramic product, or alternatively a metallic powder suitable for hot or cold sintering, a molded mandrel (12M) is obtained which is provided with radial ribs (13) corresponding to the grooves (7) and defining between them channels (14) coming to an end around the projecting core (15) molded in the cavity (9a).

Furthermore, as has been mentioned previously, when mandrels are to be obtained by molding which are of very small size, and are therefore provided with radial ribs of small thickness in order to permit the channeling between them of the material or materials extruded simultaneously, these ribs are replaced by metallic strips which are inserted, before the molding operation while the mold is still open, into the radial grooves of the conical cavity of the counter-shaped recess for the mandrel, constituting the lower portion of the mold, such that, after molding, the portions of these strips projecting from the grooves are sealed and embedded into the material for molding the body of the mandrel.

It can be clearly seen that, in the same manner as before, as indicated at phase G, the mounting of the molded mandrel (12M) in the die body (4) provides a core die (16) similar to that obtained by applying the known prior process but less expensive to manufacture by applying the novel process according to the present invention as, inter alia, the prismatic electro-erosion machining operation for producing the mandrel is eliminated and replaced by a comparatively much less expensive molding operation and it is no longer necessary to utilize a mandrel blank which would be much more expensive than the quantity of moldable product utilized.

Furthermore, the upper (M2) and lower (M1) mold portions can be used several times without any wear or deterioration to mould again other mandrels (M12).

I claim:

1. Process for manufacturing extrusion dies each comprising a main body (4) and a mandrel (12M) for channeling the material or materials extruded simultaneously, mounted in the body and provided with a core (15), the process comprises in producing the main body of the die from a blank provided with an internal conical recess and in making, in the bottom wall of this recess, by an electro-erosion wire machining operation, a calibrated passage cut to the form of the outer profile of the product to be obtained by extrusion, taking into account the swell conditions of the material or of the various materials which are to be extruded simultaneously, in which process the die mandrel (12M) intended to be mounted in the conical recess of the die body (4) and provided with a core (15) which is to be engaged in the calibrated extrusion passage (5) of the latter, is obtained by a molding operation made in a mold (M1-M2) comprising, internally, the counter-shaped recess for said mandrel machined in a cylindrical blank (M) provided with a conical cavity of dimensions corresponding to those which it is desired to obtain for the outer profile of said mandrel, said conical cavity being provided with radial grooves (7) in order to obtain, on the outer wall of said mandrel (12M), ribs (13) for forming between them flow channels (14) for the material or the various materials extruded simultaneously in the direction of the extrusion passage of the body of the die.

2. The process as claimed in claim 1, wherein the bottom wall of the conical cavity of the lower portion (M1) of the mold is provided with a recess (9a) forming a core (15), said recess having an inner profile corresponding to that of the internal channel or channels which the extruded product is to comprise and a depth determined such that, when it is inserted into the extrusion passage (5), its free end is flush with the external wall of the body (4) of the die.

3. The process as claimed in claim 1, wherein, in order to constitute the lower portion (M1) of the mold for producing the mandrel (12M), a blank (M) is utilized made from a material of a type chosen for being able to be machined easily while having a suitable degree of toughness and sufficient heat resistance in order that the mold obtained does not deform and does not undergo degradation during the operation for molding the mandrel (12M).

4. The process as claimed in claim 3, wherein the material utilized for the manufacture of the lower portion (M1) of the mold is aluminum.

5. The process as claimed in claim 3, wherein the material utilized for the manufacture of the lower portion (M1) of the mold is graphite.

6. The process as claimed in claim 1, wherein, or order to produce the mandrel (12M), a moldable material is used based on thermohardening resin material which becomes very hard after molding and which will not be able to undergo deformation through the action of the heat generated during the extrusion operation.

7. The process as claimed in claim 1, wherein, in order to produce the mandrel (12M), an impermeable ceramic product is utilized as molding material.

8. The process as claimed in claim 1, wherein, in order to produce the mandrel (12M), a metallic material is utilized, in the form of grains of metallic powder, which is suitable for undergoing a molding operation using hot or cold sintering and which, after this operation, is sufficiently rigid and compact in order to exhibit a suitable degree of toughness.

9. The process as claimed in claim 1, wherein metallic strips are inserted into the radial grooves (7) of the conical cavity of the counter-shaped recess before installing the upper portion (M2) of the mold, such that, during the molding operation, said strips will be partially sealed into the molding material and their portion previously engaged in the radial grooves will project from this molding material during the demolding of the mandrel in order to constitute the ribs (13) for forming between them flow channels for the material or materials extruded.

* * * * *